(12) United States Patent
Reid et al.

(10) Patent No.: US 9,518,446 B2
(45) Date of Patent: Dec. 13, 2016

(54) BALL VALVE WITH SEALING ELEMENT

(71) Applicant: Halliburton Energy Services, Inc., Houston, TX (US)

(72) Inventors: Michael Adam Reid, Kingswells (GB); Irvine Cardno Brown, Cults (GB)

(*) Notice: Subject to any disclaimer, the term of this patent is extended or adjusted under 35 U.S.C. 154(b) by 4 days.

(21) Appl. No.: 14/650,033

(22) PCT Filed: Aug. 29, 2014

(86) PCT No.: PCT/US2014/053339
§ 371 (c)(1),
(2) Date: Jun. 5, 2015

(87) PCT Pub. No.: WO2016/032504
PCT Pub. Date: Mar. 3, 2016

(65) Prior Publication Data
US 2016/0281461 A1   Sep. 29, 2016

(51) Int. Cl.
*F16K 11/087* (2006.01)
*E21B 34/10* (2006.01)
*F16K 5/06* (2006.01)
*E21B 47/06* (2012.01)
*E21B 43/16* (2006.01)
(Continued)

(52) U.S. Cl.
CPC ............... *E21B 34/10* (2013.01); *E21B 43/16* (2013.01); *E21B 47/06* (2013.01); *F16K 5/0689* (2013.01); *E21B 47/18* (2013.01); *E21B 2034/002* (2013.01)

(58) Field of Classification Search
USPC ................ 137/625.32, 625.47; 251/170–174
See application file for complete search history.

(56) References Cited

U.S. PATENT DOCUMENTS 2,661,926 A * 12/1953 Resek ................. F16K 11/0876
  137/625.47
3,195,857 A *  7/1965 Shafer .................. F16K 5/0647
  251/170

(Continued)

FOREIGN PATENT DOCUMENTS

WO          9301432 A1   1/1993
WO       2016032504 A1   3/2016

OTHER PUBLICATIONS

International Search Report and Written Opinion for PCT/US2014/053339 dated May 19, 2015.

*Primary Examiner* — John Fox
(74) *Attorney, Agent, or Firm* — McDermott Will & Emery LLP; Ben Fite

(57) ABSTRACT

An example ball valve includes a body defining a first valve port and a second valve port circumferentially offset from each other on the body by 180°. A valve member is positioned within the body and defines an inlet port and first and second outlet ports extending perpendicularly from the inlet port in opposing directions. First and second sealing elements are mounted on the valve member within corresponding first and second annular grooves, the first and second sealing elements being circumferentially offset from each other on the valve member by 180° and circumferentially offset from the first and second outlet ports by 90°. First and second seal systems are positioned within the first and second valve ports, respectively, and each include a valve seat engageable with the first and second sealing elements, a boost piston, and a bias spring.

23 Claims, 5 Drawing Sheets

(51) Int. Cl.
    *E21B 34/00*        (2006.01)
    *E21B 47/18*        (2012.01)

(56)              References Cited

U.S. PATENT DOCUMENTS

| | | | | |
|---|---|---|---|---|
| 4,066,241 | A | * | 1/1978 | Read .................. F16K 3/26 |
| | | | | 251/361 |
| 4,273,152 | A | | 6/1981 | Freeman |
| 4,314,581 | A | * | 2/1982 | Schrock ................ F16K 5/045 |
| | | | | 137/454.5 |
| 4,448,267 | A | | 5/1984 | Crawford, III et al. |
| 4,477,055 | A | | 10/1984 | Partridge |
| 4,572,239 | A | * | 2/1986 | Koch ................ F16K 11/0873 |
| | | | | 137/312 |
| 5,090,661 | A | * | 2/1992 | Parks, Jr. .............. F16K 3/16 |
| | | | | 251/172 |
| 5,205,536 | A | * | 4/1993 | Holec ................ F16K 5/0673 |
| | | | | 251/171 |
| 5,207,774 | A | * | 5/1993 | Wolfe ................ F16F 9/468 |
| | | | | 137/625.32 |
| 5,246,035 | A | * | 9/1993 | Skyllingstad .......... E21B 34/02 |
| | | | | 137/625.31 |
| 5,623,966 | A | * | 4/1997 | Rodger ................ F16K 5/0435 |
| | | | | 137/625.32 |
| 5,950,664 | A | * | 9/1999 | Battaglia ............. F16K 5/0414 |
| | | | | 137/375 |
| 2004/0149435 | A1 | | 8/2004 | Henderson |

* cited by examiner

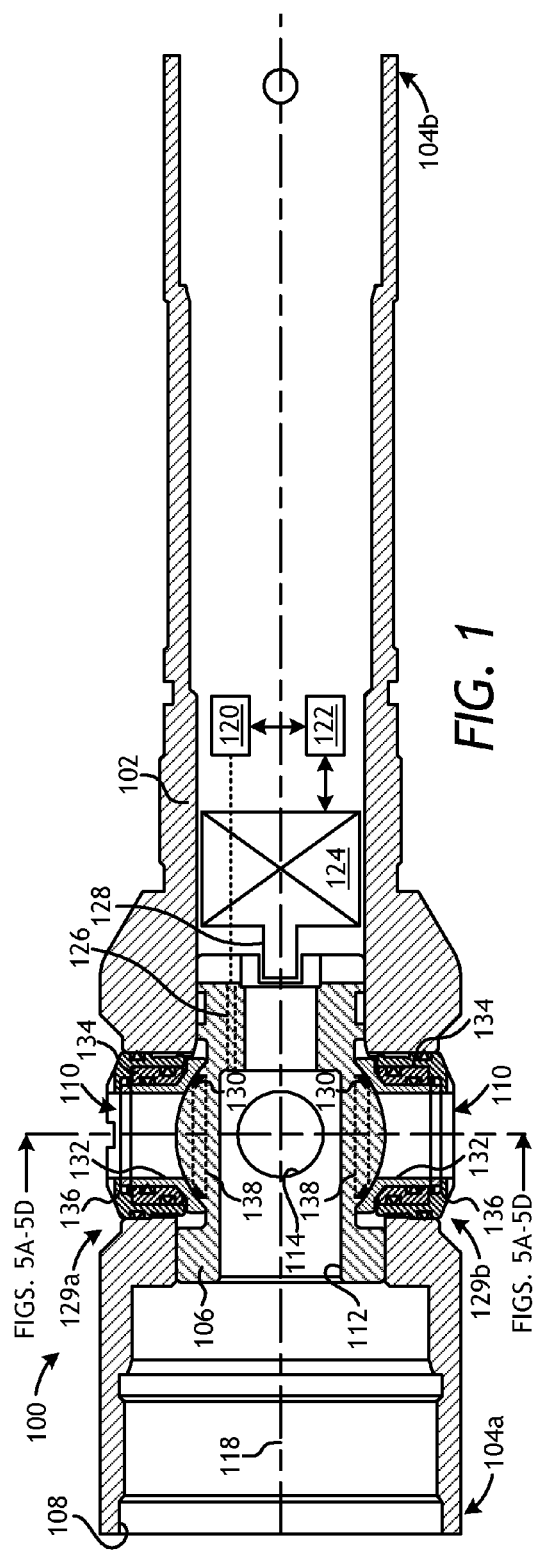

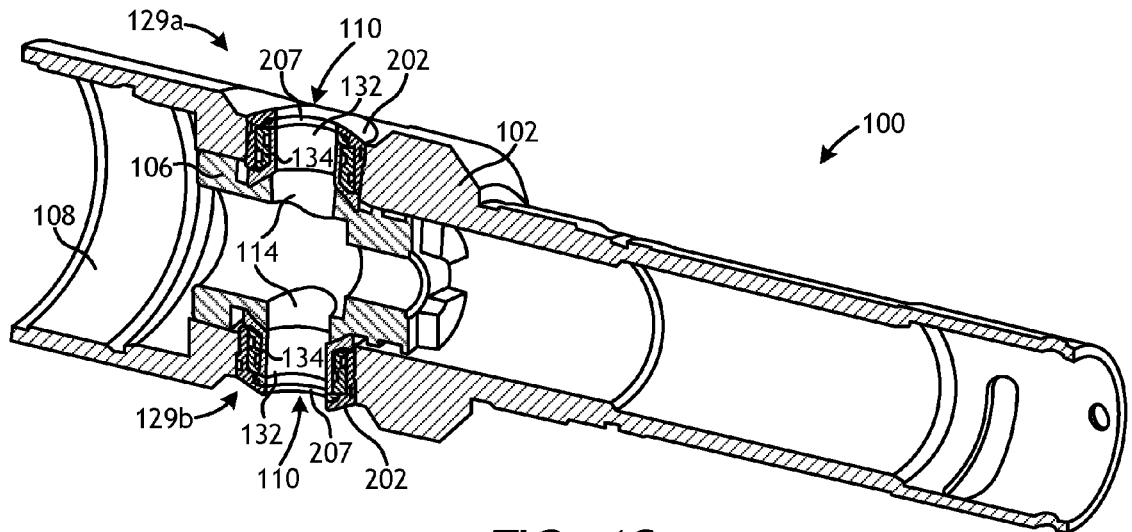
FIG. 4C
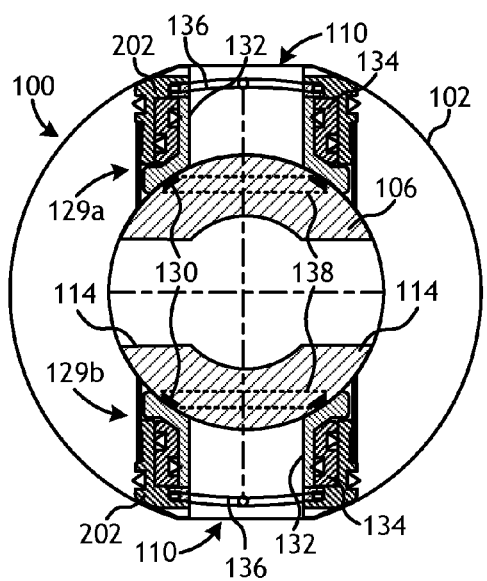
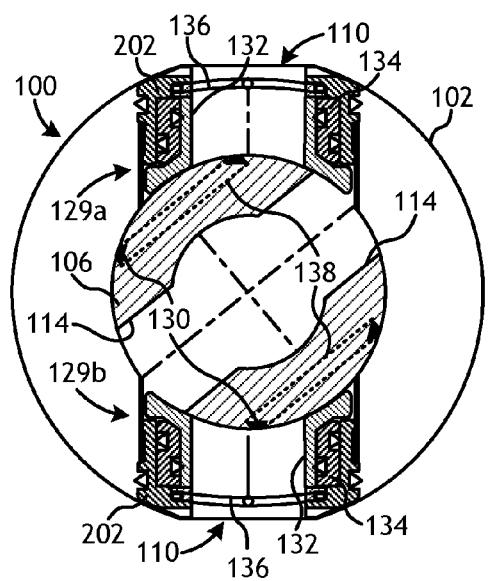
FIG. 5A          FIG. 5B

BALL VALVE WITH SEALING ELEMENT

BACKGROUND

The present disclosure relates to downhole tools and, more particularly, to ball valves used in subterranean well systems.

A ball valve is a type of fluid flow valve that uses a spherical ball as a closure mechanism. The ball portion of the ball valve has a hole or through bore defined at least partially therethrough that aligns with the direction of fluid flow when the ball valve is opened and misaligns with the direction of fluid flow when the ball valve is closed. Ball valves have many applications in downhole tools for use in a wellbore, such as formation tester valves and safety valves. Ball valves are used in many wellbore operations since ball valves can provide a large through bore that allows for the passage of tools, tubing strings, and high-volume fluid flow. Ball valves are also compactly arranged. For example, ball valves typically have a cylindrical outer profile that corresponds to the cylindrical outer profile of the remainder of a tool string that carries the ball valve into the wellbore and therefore presents few or no protrusions to hang up on the interior of the well.

Some wellbore operations require downhole tools that are rated to the highest performance standards of the International Organization for Standardization (ISO). For instance, some downhole tools, such as packers and bridge plugs, must be V0 ("V-not") rated, which corresponds to the ISO 14310-V0 standard and consists of the highest or strongest industry validation. A ball valve that is V0 rated consists of a ball valve that can be used in a downhole environment and remains gas tight and bubble free during operation.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIG. 1 is a cross-sectional side view of an exemplary ball valve.

FIG. 2 is an enlarged cross-sectional side view of the first seal system of FIG. 1.

FIGS. 4A-4C are progressive isometric cross-sectional side views of the ball valve of FIG. 1 as moving between closed and open positions.

FIGS. 5A-5D are progressive cross-sectional end views of the ball valve of FIG. 1 as moving between closed and open positions.

DETAILED DESCRIPTION

Figure 3A:
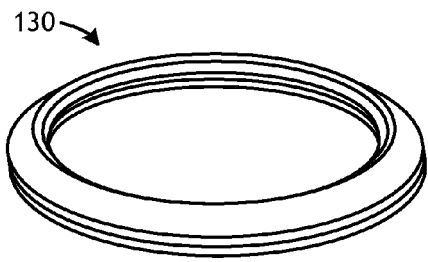
FIGS. 3A-3D are schematic diagrams of various views of the sealing element of FIGS. 1-2.

The present disclosure relates to downhole tools and, more particularly, to ball valves used in subterranean well systems.

The embodiments described herein provide a ball valve that is able to seal in both directions. The ball valve has sealing elements positioned on a movable valve member that sealingly engage corresponding valve seats provided within the ball valve. Upon assuming a pressure differential across the ball valve, boost pistons provided in the ball valve apply radial forces against the valve seats, which transfer the radial forces to the sealing engagement with the sealing elements. Accordingly, any increases in the pressure differential across the ball valve may result in a corresponding increase in the sealed engagement between the valve seats and the sealing elements.

Referring to FIG. 1, illustrated is a cross-sectional side view of an exemplary ball valve 100, according to one or more embodiments. The ball valve 100 may be designed to be used in a downhole environment, where the ball valve 100 may be subjected to elevated temperatures and pressures for long periods. According to the present disclosure, the ball valve 100 may be V0 ("V-not") rated in accordance with the performance standards of the International Organization for Standardization (ISO). For instance, the ball valve 100 may be designed such that it conforms to the industry validation standards consistent with ISO 14310-V0, which require the ball valve 100 to retain gas pressure with zero leakage in both directions; i.e., with elevated pressures on the inside or the outside of the ball valve 100. In some embodiments, the ball valve 100 may also be an ISO 28781-V1 rated product and otherwise compliant therewith.

As illustrated, the ball valve 100 may include a body 102 having a first end 104a, a second end 104b, and a valve member 106 movably arranged within the body 102 between the first and second ends 104a,b. At the first end 104a, the body 102 may define or otherwise provide an inlet 108 that allows fluids to fluidly communicate with the valve member 106 from the first end 104a. The inlet 108 may also provide a location to couple the ball valve 100 to a downhole anchoring device, such as a wireline lock or a bridge plug, that may then be subsequently located within production tubing, for example. For example, the ball valve 100 may be configured to be coupled at the first end 104a to a pipe, a conduit, or other tubular fluid member that may be configured to convey fluids to the ball valve 100, such as in an injection operation. In other embodiments, the ball valve 100 may be configured to convey fluids to the pipe, the conduit, or the other tubular fluid member, such as in a production operation.

The body 102 may further define or otherwise provide two valve ports 110 that provide fluid communication between the interior and exterior of the ball valve 100 and, more particularly, between the valve member 106 and the exterior of the ball valve 100. In some embodiments, the exterior of the ball valve 100 may be the interior of another downhole tool, such as a service tool used in gravel packing operations of a wellbore. As illustrated, the valve ports 110 are circumferentially offset from each other about the outer circumference of the body 102. In some embodiments, the valve ports 110 may be circumferentially offset from each other by 180° about the outer circumference of the body 102. In other embodiments, however, the valve ports 110 may be circumferentially offset from each other by any angular distance about the outer circumference of the body 102 (e.g., 175°, 170°, 165°, etc., and any subsets therebetween), without departing from the scope of the disclosure.

The valve member 106 may be a generally spherical structure that includes or otherwise defines an inlet port 112 and two outlet ports 114. The inlet port 112 may place the outlet ports 114 in fluid communication with the inlet 108 to the ball valve 100. The outlet ports 114 may be in fluid communication with the inlet port 112 and extend perpendicularly from the inlet port 112 in opposing directions. The outlet ports 114 may be circumferentially offset from each other about the outer circumference of the valve member 106 by any angular distance configured to align with the valve ports 110. Accordingly, in at least one embodiment, the outlet ports 114 may be circumferentially offset from each other by 180° about the outer circumference of the valve member 106. In other embodiments, however, the outlet ports 114 may be circumferentially offset from each other by any other angular distance (e.g., 175°, 170°, 165°, etc., and any subsets therebetween), without departing from the scope of the disclosure.

The valve member 106 may be movable or otherwise rotatable about a central axis 118. More particularly, the valve member 106 may be movable between a closed position, where the outlet ports 114 are misaligned with the valve ports 110, as depicted in FIG. 1, and an open position, where the valve member 106 is rotated 90° to align the outlet ports 114 with the valve ports 110. Once aligned with the valve ports 110, the outlet ports 114 may be able to fluidly communicate with the exterior of the ball valve 100 via the valve ports 110. In some embodiments, for instance, fluids may be introduced into the ball valve 100 via the inlet 108 and ejected from the ball valve 100 via the valve ports 110 after flowing through the inlet port 112 and the outlet ports 114. In other embodiments, however, fluids may be received into the ball valve 100 via the valve ports 110 and flow out of the ball valve 100 via the inlet 108 after flowing through the outlet ports 114 and the inlet port 112.

In some embodiments, the ball valve 100 may be actuated manually. In other embodiments, however, the ball valve 100 may be a computer-controlled, electromechanical device that may be repeatedly opened and closed by remote command. For instance, the ball valve 100 may be similar in some respects to the electromechanical ball valve device or tool commercially available under the trade name ERED® and manufactured by Red Spider Technology through Halliburton Energy Services of Houston, Tex., USA. The ball valve 100 may include a sensing system 120, a signal processor 122, and an actuation device 124 arranged within the body 102. The inlet port 112 may feed a pressure channel 126 that extends axially through the valve member 106 and fluidly communicates with the sensing system 120. The sensing system 120 may include one or more pressure sensors or transducers configured to detect, measure, and report fluid pressures within the ball valve 100 as sensed through the pressure channel 126.

The sensing system 120 may be communicably coupled to the signal processor 122, which may be configured to receive pressure signals generated by the sensing system 120. While not shown, the signal processor 122 may include various computer hardware used to operate the ball valve 100 including, but is not limited to, a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), or erasable programmable read only memory (EPROM)), registers, hard disks, removable disks, CD-ROMS, or any other like suitable storage device or medium.

The actuation device 124 may be communicably coupled to the signal processor 122 and configured to actuate the valve member 106 upon receiving a command signal generated by the signal processor 122. In at least one embodiment, the actuation device 124 may be operatively coupled to the valve member 106, such as via a drive shaft 128, a gearing mechanism, or the like. The actuation device 124 may be any electrical, mechanical, electromechanical, hydraulic, or pneumatic actuation device that is able to rotate the valve member 106 about the central axis 118 and thereby move the valve member 106 between the open and closed positions. In the illustrated embodiment, for example, when a given command signal is received from the signal processor 122, the actuation device 124 may be configured to rotate the valve member 106 about the central axis 118 from the closed position to the open position.

In some embodiments, the ball valve 100 may be programmed to be responsive to pressure pulses sensed by the sensing system 120 via the pressure channel 126. The sensing system 120 may be configured to detect the pressure pulses and report the same to the signal processor 122, which compares the received pressure signals with one or more signature pressure pulses stored in memory. Once a signature pressure pulse is detected by the sensing system 120, the signal processor 122 may be configured to generate and send a command signal to the actuation device 124 to actuate the valve member 106 between open and closed positions. The signature pressure pulse that may trigger the ball valve 100 may include one or more cycles of pressure pulses at a predetermined amplitude (i.e., strength or pressure) and/or over a predetermined amount of time (i.e., frequency). In other embodiments, the signature pressure pulse may be a series of pressure increases over a predetermined or defined time period followed by a reduction of the pressure for another predetermined or defined period. As will be appreciated by those skilled in the art, there are several different types or configurations of potential signature pressure pulses that may be used to trigger actuation of the ball valve 100.

When in the closed position, as illustrated in FIG. 1, the ball valve 100 may be configured to hold pressure whether elevated pressures are present on the exterior of the ball valve 100 or within the ball valve 100. To accomplish this, the ball valve 100 may further include two seal systems 129, shown as a first seal system 129a and a second seal system 129b. Each seal system 129a,b may be identical and include a sealing element 130 positioned on the valve member 106, a valve seat 132, a boost piston 134, and a bias spring 136. As illustrated, each valve seat 132, boost piston 134, and bias spring 136 may be positioned within a corresponding one of the valve ports 110.

In the closed position, the sealing elements 130 may be configured to contact and otherwise sealingly engage the corresponding valve seats 132. As used herein, the phrase "sealingly engage" and any variation thereof refers to the ability to prevent fluid migration in either direction. For example, a sealingly engaged interface would be able to retain gas pressure with zero leakage in both directions. Conventional ball valves typically utilize sealing elements or "soft seals" as positioned on the valve seats 132 rather than on the valve member 106. Such conventional ball valves, however, are only able to provide a gas tight seal in one direction. The ball valve 100 described herein, however, provides the sealing elements 130 on the valve member 106, which provides the ball valve 100 with a sealing geometry that allows for bi-directional sealing capabilities.

The sealing elements 130 may be mounted on the valve member 106 within corresponding annular grooves 138 defined in the valve member 106. As illustrated, the annular grooves 138 may be angularly offset from each other along the outer circumference of the valve member 106. In some embodiments, the annular grooves 138 may be angularly offset from each other to the same or substantially the same angular offset as the outlet ports 114. For instance, in at least one embodiment, the annular grooves 138 may be circumferentially offset from each other by 180° about the outer circumference of the valve member 106. In other embodiments, however, the annular grooves 138 may be circumferentially offset from each other by any other angular distance (e.g., 175°, 170°, 165°, etc., and any subsets therebetween), without departing from the scope of the disclosure.

The annular grooves 138 may also be angularly offset from the outlet ports 114 along the outer circumference of the valve member 106. In some embodiments, the annular grooves 138 may be angularly offset from the outlet ports 114 by 90°, but may equally be angularly offset from the outlet ports 114 by any other angular distance, depending on the design of the ball valve 100. For instance, the annular grooves 138 may be angularly offset from the outlet ports 114 by 85°, 80°, 75°, 70°, 65°, or any subset therebetween, or may alternatively be angularly offset from the outlet ports 114 by 95°, 100°, 105°, 110°, 115°, or any subset therebetween, without departing from the scope of the disclosure.

In some embodiments, the annular grooves 138 may each be formed in a dovetail shape or another shape that helps retain the sealing elements 130 therein. To help ensure that the sealing elements 130 are able to withstand high pressure differentials without being blown out of the annular grooves 138 during operation, the sealing elements 130 may be positioned within the annular grooves 138 such that minimal or no extrusion gap (e.g., between the valve member 106 and the valve seats 132) results.

Referring now to FIG. 2, with continued reference to FIG. 1, illustrated is an enlarged cross-sectional side view of the first seal system 129a, according to one or more embodiments. For purposes of this disclosure, the first seal system 129a will be described with the understanding that the second seal system 129b is identical in structure and operation to the first seal system 129a. As illustrated, the valve seat 132, the boost piston 134, and the bias spring 136 may be secured within the valve port 110 with the help of an annular retainer 202. One or more seals 204 (one shown) may be positioned between the retainer 202 and the inner wall of the valve port 110 to provide a fluid tight engagement therebetween. In some embodiments, the seal 204 may be positioned within a groove 206 defined in the retainer 202. In other embodiments, the seal 204 may be positioned within a groove (not shown) defined in the wall of the valve port 110, without departing from the scope of the disclosure.

The bias spring 136 may be positioned between the valve seat 132 and the retainer 202. The bias spring 136 may be configured to apply a constant radial force on the valve seat 132 and thereby urge the valve seat 132 into engagement with the valve member 106 and, more particularly, into sealing engagement with the sealing element 130. In some embodiments, the first seal system 129a may include a spring spacer 207 that interposes the bias spring 136 and the valve seat 132 and otherwise maintains the bias spring 136 engaged with the retainer 202. In such embodiments, the bias spring 136 may apply a constant radial force on the spring spacer 207, which transfers the radial force to the valve seat 132 and thereby urges the valve seat 132 into engagement with the valve member 106 and the sealing element 130. Accordingly, the bias spring 136 may be configured to provide a first or initial amount of sealing capability to the first seal system 129a.

The boost piston 134 may be configured to provide full sealing capability to the first seal system 129a, and allow the first seal system 129a to seal in both directions, regardless of which way the pressure differential is directed across the valve member 106. As illustrated, the boost piston 134 may be located within a cavity 209 defined between the retainer 202 and the valve seat 132 and may include an inner seal 208a and an outer seal 208b. The inner seal 208a may be positioned between the boost piston 134 and the valve seat 132, and the outer seal 208b may be positioned between the boost piston 134 and the retainer 202. Accordingly, the inner seal 208a may be configured to seal against an outer diameter of the valve seat 132, and the outer seal 208b may be configured to seal against an inner diameter of the retainer 202.

The location on the valve seat 132 where the sealing element 130 makes contact may dictate how well the first seal system 129a is able to seal in both directions. More particularly, in some embodiments, the sealing element 130 may have an inner diameter 210a that is greater than the inner diameter 210b of the inner seal 208a as sealingly engaged against the valve seat 132. Moreover, the sealing element 130 may further have an outer diameter 212a that is less than the outer diameter of the outer seal 208b as sealingly engaged against the retainer 202. The inner diameter 210b of the inner seal 208a and the outer diameter 212b of the outer seal 208b are collectively referred to herein as the "seal diameters" of the boost piston 134. The seal point of the sealing element 130 may be located between the seal diameters of the boost piston 134 such that any radial movement (i.e., up or down in FIG. 2) of the boost piston 134 within the cavity 209 may result in a radial force being applied against the valve seat 132 and, in turn, against the sealing element 130. Such a resulting radial force may serve to increase the sealing capability of the first seal system 129a at the sealing element 130 in both directions.

Exemplary operation of the first seal system 129a in the closed position is now provided. Prior to generating a pressure differential across the first seal system 129a, such as an elevated pressure inside or exterior to the ball valve 100, the bias spring 136 may be configured to provide a first or initial amount of sealing capability to the first seal system 129a, as generally described above. Upon generating a pressure differential across the first seal system 129a, however, the boost piston 134 may be configured to apply additional radial force against the valve seat 132 and, therefore, against the sealing element 130 to increase the sealing capability of the first seal system 129a.

In some embodiments, the pressure differential may comprise a higher pressure within the ball valve 100 as compared with the pressure exterior to the ball valve 100. In such embodiments, a high-pressure fluid flow may migrate past an interface between the valve member 106 and the body 102 of the ball valve 100, as shown by the arrows A. A first portion of the high pressure fluid flow A may attempt to migrate past the valve member 106 and into the valve port 110, but will be stopped at the sealing element 130 as sealingly engaged with the valve seat 132. A second portion of the high-pressure fluid flow A may enter the cavity 209, but may be resisted by the inner and outer seals 208a,b of the boost piston 134. As the inner and outer seals 208a,b capture and stop the second portion of the high pressure fluid flow A, the boost piston 134 may be slightly separated from the retainer 202 within the cavity 209 and simultaneously place an increased radial load against an angled portion 214 of the valve seat 132. The increased radial load against the angled portion 214 may be transferred to the sealing engagement between the valve seat 132 and the sealing element 130, thereby increasing the sealing capability of the first seal system 129a. As will be appreciated, increasing the pressure of the high-pressure fluid flow A will result in a commensurate increase in the sealing capability of the first seal system 129a, as the sealing engagement between the valve seat 132 and the sealing element 130 correspondingly increases.

In other embodiments, the pressure differential may comprise a higher pressure on the exterior of the ball valve 100 as compared to the pressure inside the ball valve 100. In such embodiments, a high-pressure fluid flow may attempt to migrate into the interior of the ball valve 100 to seek pressure equilibrium, as shown by the arrows B. A first portion of the high-pressure fluid flow B may attempt to migrate past the valve member 106, but will be stopped at the sealing element 130 as sealingly engaged against the valve seat 132. A second portion of the high-pressure fluid flow B may enter the cavity 209 where the boost piston 134 is located and may be resisted by the inner and outer seals 208a,b. As the inner and outer seals 208a,b capture and stop the second portion of the high pressure fluid flow B, the boost piston 134 may be forced radially downward against the angled portion 214 of the valve seat 132 and thereby deliver an increased radial load to the sealing engagement between the valve seat 132 and the sealing element 130. Again, any increase in the pressure differential will result in a commensurate increase in the sealing capability of the first seal system 129a, as the sealing engagement between the valve seat 132 and the sealing element 130 correspondingly increases.

Accordingly, regardless of the direction of the pressure differential, the first seal system 129a resists the migration of high-pressure fluid flows A and B, which results in a radial force that pushes the valve seat 132 into increased sealing engagement with the valve member 106 and the sealing element 130. As a result, regardless of whether there is higher pressure inside or outside of the ball valve 100, the net effect is that the sealing engagement between the valve member 106 and the sealing element 130 is increased. Moreover, since the inner and outer diameters 210a, 212a of the sealing element 130 lie within the seal diameters of the boost piston 134 (i.e., the inner diameter 210b of the inner seal 208a and the outer diameter 212b of the outer seal 208b), an inwardly directed force against the sealing element 130 may be generated regardless of the direction of the pressure differential.

Figure 3B:
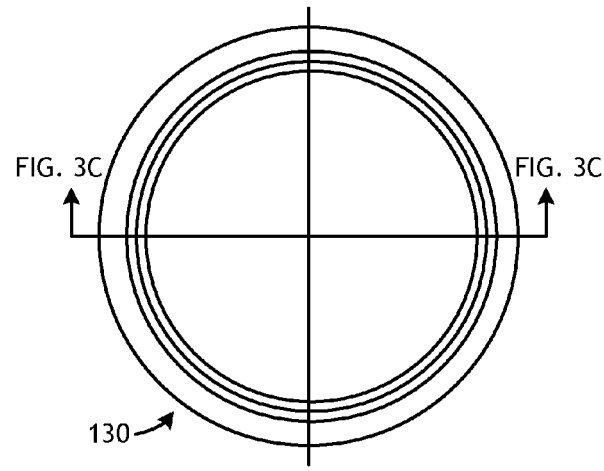
Figure 3C:
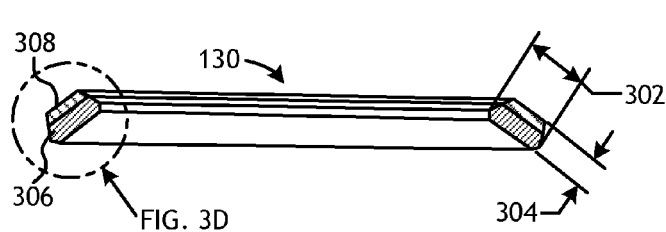
Figure 3D:
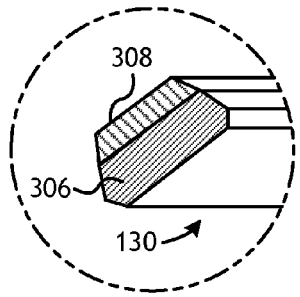

Referring now to FIGS. 3A-3D, illustrated are various schematic diagrams and views of the sealing element 130 of FIGS. 1-2, according to one or more embodiments. More particularly, FIG. 3A is an isometric view of the sealing element 130, FIG. 3B is a plan view of the sealing element 130, FIG. 3C is a partial cross-sectional view of the sealing element 130 as taken along the line indicated in FIG. 3B, and FIG. 3D is an enlarged partial cross-sectional view of the sealing element 130 taken at the location indicated in FIG. 3C. As illustrated, the sealing element 130 may be generally annular or circular in shape.

As best seen in FIGS. 3C and 3D, the sealing element 130 may exhibit a generally dovetail cross-sectional shape that may allow the sealing element 130 to be positioned within a correspondingly dovetail-shaped annular groove 138 (FIGS. 1-2) defined in the valve member 106 (FIGS. 1-2), as described above. As will be appreciated, other cross-sectional shapes may equally be employed for the sealing element 130, without departing from the scope of the present disclosure.

In FIG. 3C, the sealing element 130 is depicted as exhibiting a width 302 and a depth 304. The width 302 and the depth 304 may be configured such that the sealing element 130 may be securely positioned within the annular groove 138 (FIGS. 1-2). In some embodiments, the depth 304 of the sealing element 130 may be configured such that the sealing element 130 does not extend out of the annular groove 138, and thereby results in little or no extrusion gap. In such embodiments, the valve seat 132 (FIGS. 1 and 2) may be configured to sealingly engage both the valve member 106 (e.g., a metal-to-metal seal) and the sealing element 130. As will be appreciated, any extrusion gap may potentially result in the sealing element 130 being blown out of the annular groove 138 upon assuming elevated pressures.

The sealing element 130 may be made of a variety of materials including, but not limited to, polymers, rubbers, elastomers, and any derivatives thereof. In some embodiments, the sealing element 130 may be made of two or more materials. In the illustrated embodiment, for instance, the sealing element 130 may include a first or inner material layer 306 and a second or outer material layer 308. In at least one embodiment, the inner material layer 306 may be made of an elastomer, such as VITON® or a nitrile, and the outer material layer 308 may be made of a polymer, such as polytetrafluoroethylene (PTFE) or polyether ether ketone (PEEK). In yet other embodiments, a malleable metal, such as copper or aluminum, may be used as the outer material layer 308.

Figure 4A:
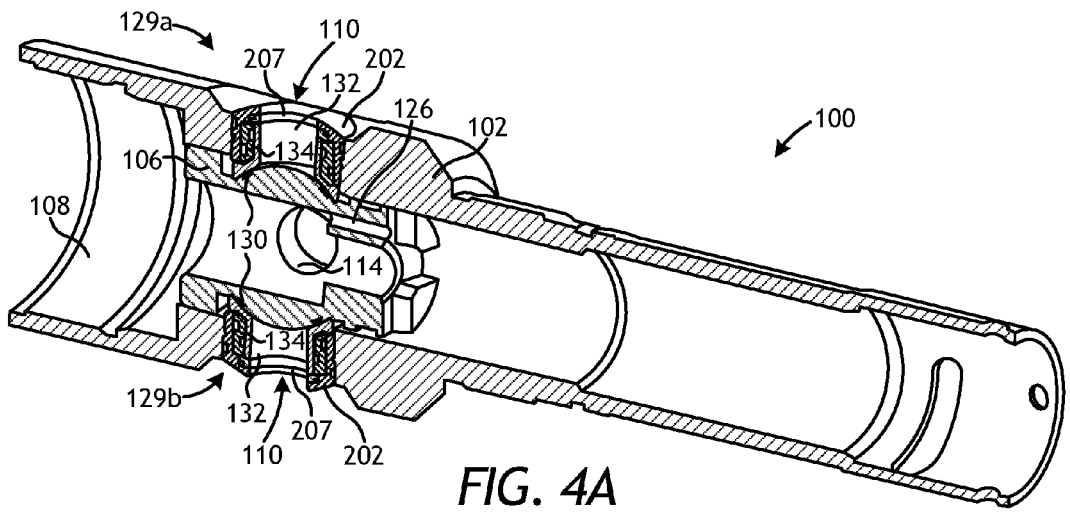
Figure 4B:
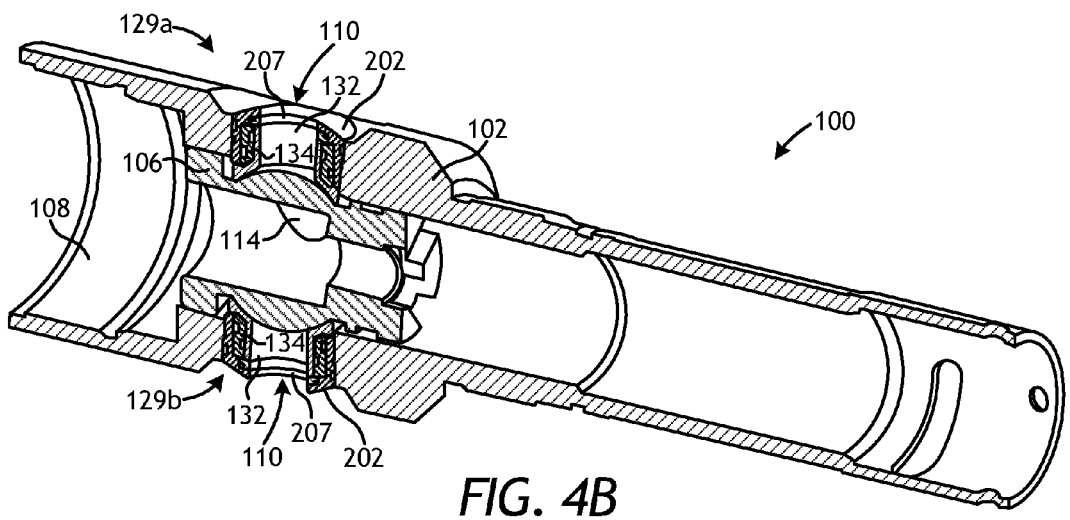

FIGS. 4A-4C depict progressive isometric cross-sectional side views of the ball valve 100 as it moves between the closed and open positions, according to one or more embodiments. More particularly, FIG. 4A depicts the ball valve 100 in the closed position, FIG. 4B depicts the ball valve 100 at about 45° between the closed and open positions, and FIG. 4C depicts the ball valve 100 in the open position. Like numerals used in prior figures correspond to similar components that will not be described again in detail. The sensing system 120, the signal processor 122, and the actuation device 124 of FIG. 1 are omitted from FIGS. 4A-4C, but could otherwise be included to help undertake the actuation of the ball valve 100, as described above.

In FIG. 4A, the valve member 106 is in the closed position, where the outlet ports 114 are misaligned with the valve ports 110. In the closed position, as described above, the valve seats 132 of each seal system 129a,b are in sealing engagement with the outer surface of the valve member 106 and the sealing elements 130. Regardless of the direction of a potential pressure differential across the ball valve 100, the first and second seal systems 129a,b may be configured to resist the migration of high-pressure fluid flows. Rather, as is also described above, upon assuming a pressure differential, the first and second seal systems 129a,b may be configured to apply a radial force that pushes the valve seats 132 into increased sealing engagement with the valve member 106 and the sealing elements 130.

In FIG. 4B, the valve member 106 has been rotated about the central axis 118 (FIG. 1) about 45°. In this position, the outlet ports 114 are not aligned with the valve ports 110, but a small amount of fluid flow may be able to escape through the outlet ports 114, as discussed in more detail below.

In FIG. 4C, the valve member 106 has been rotated about the central axis 118 (FIG. 1) 90° from the position shown in FIG. 4A, and thereby aligning the outlet ports 114 with the valve ports 110. In this position, the ball valve 100 may be used for injection or production operations. More particularly, in the open position, the ball valve 100 may receive fluids via the valve ports 110, as in a production operation, or otherwise receive fluids via the inlet 108, as in an injection operation.

Figure 5C:
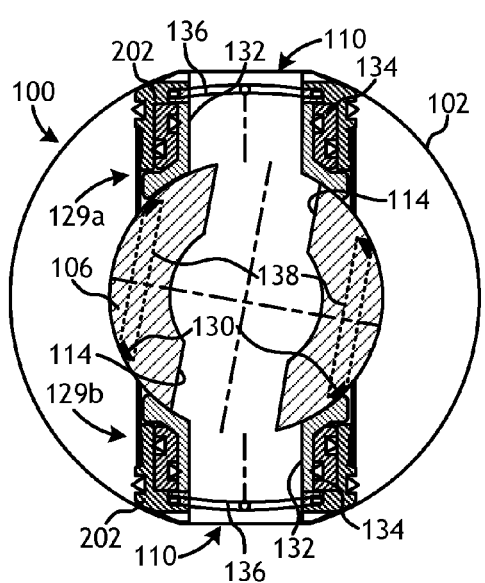
Figure 5D:
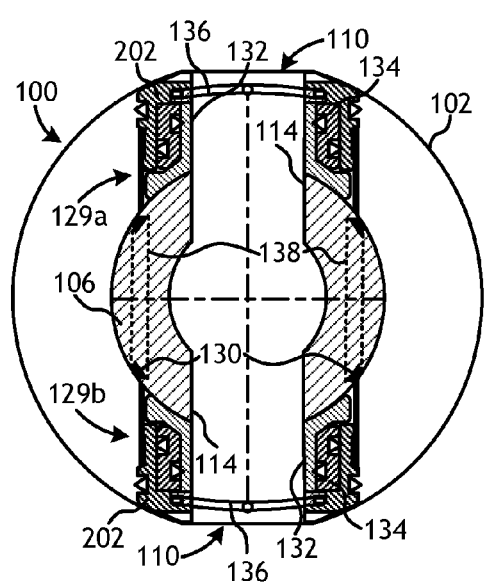

FIGS. 5A-5C are progressive cross-sectional end views of the ball valve 100 as taken along the line indicated in FIG. 1, according to one or more embodiments. FIGS. 5A-5D depict the ball valve 100 moving between the closed position, as shown in FIG. 5A, and the open position, as shown in FIG. 5D. Again, like numerals used in prior figures correspond to similar components that will not be described again in detail. In FIG. 5A, the valve member 106 is in the closed position, where the outlet ports 114 are misaligned with the valve ports 110 and valve seats 132 of each seal system 129*a,b* are in sealing engagement with the outer surface of the valve member 106 and, more particularly, with the sealing elements 130.

In FIG. 5B, the valve member 106 has been moved to a position where the sealing elements 130 are disengaged from the valve seats 132. In some embodiments, the valve member 106 may be moved to a fractional open position. As used herein, the phrase "fractional open position" refers to a position of the valve member 106 between the closed and open positions where the outlet ports 114 begin to become exposed to the valve ports 110 and are otherwise able to facilitate at least a portion of fluid communication past the valve seats 132. The valve member 106 in FIG. 5B is depicted in a first fractional open position, where a small amount of highly choked fluid is able to bypass the outlet ports 114 and the valve seats 132. In FIG. 5C, the valve member 106 is depicted in a second fractional open position greater than the first fractional open position. In the second fractional open position, the valve member 106 may be able to provide more fluid flow as compared with the first fractional open position, but the fluid flow will nonetheless be choked as compared to the fully open position.

As will be appreciated, the valve member 106 may be moved through several fractional open positions before moving to the fully open position, as shown in FIG. 5D. In some embodiments, the valve member 106 may be moved to a predetermined fractional open position and stopped for a predetermined amount of time. While in the predetermined fractional open position, a pressure differential across the ball valve 100 may be able to equalize or substantially equalize prior to moving the valve member 106 to the fully open position. As will be appreciated, this may prove advantageous in protecting the sealing elements 130 from being blown out of the annular grooves 138, which may otherwise be exposed to the full thrust of the pressure differential. Once the ball valve 100 has equalized, the effect of the boost piston 134 may diminish, thereby allowing the valve seat 132 to "float," which will allow the valve member 106 to more easily move to the fully open position.

In some embodiments, the signal processor 122 (FIG. 1) and the actuation device 124 (FIG. 1) may be used to move the valve member 106 to the predetermined fractional open positions, as described above. The signal processor 122 may be programmed to send a command signal to the actuation device 124 to rotate the valve member 106 to a certain percentage of fully open, such as 5%, 10%, 25%, etc., so that a small amount of fluid flow through the ball valve 100 is facilitated. Following a predetermined time period, or after the flow equalizes across the ball valve 100, the signal processor 122 may be configured to send another command signal to the actuation device 124 to move the valve member 106 to the fully open position, as shown in FIG. 5D.

Embodiments disclosed herein include:

A. A ball valve that includes a body defining a first valve port and a second valve port circumferentially offset from each other on the body by a first angular distance, a valve member positioned within the body and rotatable about a central axis, the valve member defining an inlet port and first and second outlet ports extending perpendicularly from the central axis, wherein the valve member is rotatable about the central axis between a closed position, where the first and second outlet ports are misaligned with the first and second valve ports, and an open position, where first and second outlet ports are aligned with the first and second valve ports, a first sealing element mounted within a first annular groove defined on the valve member, and a second sealing element mounted within a second annular groove defined on the valve member, the first and second sealing elements being circumferentially offset from each other on the valve member by the first angular distance and circumferentially offset from the first and second outlet ports by a second angular distance, and a first seal system positioned within the first valve port and a second seal system positioned within the second valve port, the first and second seal systems each including a valve seat engageable with the first and second sealing elements, a boost piston arranged within a cavity defined at least in part by the valve seat, and a bias spring engageable with the valve seat.

B. A method that includes providing a ball valve that includes a body that defines first and second valve ports circumferentially offset from each other on the body by a first angular distance, a valve member positioned within the body and rotatable about a central axis, the valve member defining an inlet port and first and second outlet ports extending perpendicularly from the central axis, a first sealing element mounted within a first annular groove defined on the valve member, and a second sealing element mounted within a second annular groove defined on the valve member, the first and second sealing elements being circumferentially offset from each other on the valve member by the first angular distance and circumferentially offset from the first and second outlet ports by a second angular distance, and a first seal system positioned within the first valve port and a second seal system positioned within the second valve port, the first and second seal systems each including a valve seat, a boost piston arranged within a cavity defined at least in part by the valve seat, and a bias spring engageable with the valve seat. Engaging the valve seat of each seal system on the valve member with the valve member in a closed position, where the first and second outlet ports are misaligned with the first and second valve ports, generating a pressure differential across the ball valve and across each of the first and second seal systems, urging the valve seat of each seal system against the valve member with the boost piston of each seal system in response to the pressure differential, sealingly engaging the valve seat of the first seal system against the valve member and the first sealing element, and sealingly engaging the valve seat of the second seal system with the valve member and the second sealing element.

Each of embodiments A and B may have one or more of the following additional elements in any combination: Element 1: further comprising a sensing system including one or more pressure sensors that detect fluid pressure within the body, a signal processor communicably coupled to the sensing system to receive pressure signals generated by the sensing system, and an actuation device communicably coupled to the signal processor and operatively coupled to the valve member, the actuation device being configured to rotate the valve member about the central axis upon receiving a command signal from the signal processor. Element 2: wherein at least one of the first and second annular grooves are defined in the valve member in a dovetail shape. Element 3: wherein the first and second sealing elements provide no extrusion gap extending out of the first and second annular grooves, respectively. Element 4: wherein, when the valve member is in the closed position, the first sealing element sealingly engages the valve seat of the first seal system and the second sealing element sealingly engages the valve seat of the second seal system. Element 5: wherein the first and second seal systems each further comprise a retainer, and wherein the bias spring is positioned between the valve seat and the retainer to apply a constant radial force on the valve seat and thereby urge the valve seat into engagement with the valve member. Element 6: wherein the first and second seal systems each further comprise a spring spacer that interposes the bias spring and the valve seat. Element 7: wherein the first and second seal systems each further comprise a retainer, and wherein the boost piston includes an inner seal and an outer seal, the inner seal being positioned between the boost piston and the valve seat, and the outer seal being positioned between the boost piston and the retainer. Element 8: wherein each sealing element exhibits an inner diameter that is greater than an inner diameter of the inner seal as sealingly engaged against the valve seat and an outer diameter that is less than an outer diameter of the outer seal as sealingly engaged against the retainer. Element 9: wherein the first and second sealing elements are made of a material selected from the group consisting of a polymer, a rubber, an elastomer, and any derivative thereof. Element 10: wherein the first and second sealing elements are made of at least two of the materials.

Element 11: wherein engaging the valve seat of each seal system on the valve member comprises urging the valve seat of each seal system against the valve member with the bias spring of each seal system and thereby providing the ball valve an initial seal. Element 12: wherein generating the pressure differential across the ball valve comprises at least one of generating a higher pressure inside the ball valve as compared to outside the ball valve and generating a higher pressure outside the ball valve as compared to inside the ball valve. Element 13: wherein the first and second seal systems each further comprise a retainer, and the boost piston of each seal system includes an inner seal positioned between the boost piston and the valve seat and an outer seal positioned between the boost piston and the retainer, and wherein urging the valve seat of each seal system against the valve member with the boost piston of each seal system further comprises preventing fluid migration between the boost piston and the valve seat with the inner seal, preventing fluid migration between the boost piston and the retainer with the outer seal, and placing a radial load against an angled portion of the valve seat with the boost piston. Element 14: further comprising rotating the valve module about a central axis from the closed position toward an open position, where the first and second outlet ports are aligned with the first and second valve ports. Element 15: wherein rotating the valve module about the central axis comprises rotating the valve module with an actuation device operatively coupled to the valve module. Element 16: further comprising undertaking at least one of a production operation and an injection operation while the valve module is in the open position. Element 17: further comprising rotating the valve member to a fractional open position between the closed and open positions, allowing a choked fluid flow to bypass the valve ports and the valve seats while the valve member is in the fractional open position, and rotating the valve member to the open position. Element 18: wherein rotating the valve member to the fractional open position further comprises holding the valve member in the fractional open position for a predetermined amount of time. Element 19: wherein rotating the valve member to the fractional open position further comprises holding the valve member in the fractional open position until the pressure differential is removed.

By way of non-limiting example, exemplary combinations applicable to A, B, C include: Element 5 with Element 6; Element 7 with Element 8; Element 9 with Element 10; Element 14 with Element 15; Element 14 with Element 16; Element 17 with Element 18; and Element 17 with Element 19.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A ball valve, comprising:
    a body defining a first valve port and a second valve port circumferentially offset from each other on the body by a first angular distance;
    a valve member positioned within the body and rotatable about a central axis, the valve member defining an inlet port and first and second outlet ports extending perpendicularly from the central axis, wherein the valve member is rotatable about the central axis between a closed position, where the first and second outlet ports are misaligned with the first and second valve ports, and an open position, where first and second outlet ports are aligned with the first and second valve ports;
    a first sealing element mounted within a first annular groove defined on the valve member, and a second sealing element mounted within a second annular groove defined on the valve member, the first and second sealing elements being circumferentially offset from each other on the valve member by the first angular distance and circumferentially offset from the first and second outlet ports by a second angular distance; and
    a first seal system positioned within the first valve port and a second seal system positioned within the second valve port, the first and second seal systems each including a valve seat engageable with the first and second sealing elements, a boost piston arranged within a cavity defined at least in part by the valve seat, and a bias spring engageable with the valve seat.

2. The ball valve of claim 1, further comprising:
    a sensing system including one or more pressure sensors that detect fluid pressure within the body;
    a signal processor communicably coupled to the sensing system to receive pressure signals generated by the sensing system; and
    an actuation device communicably coupled to the signal processor and operatively coupled to the valve member, the actuation device being configured to rotate the valve member about the central axis upon receiving a command signal from the signal processor.

3. The ball valve of claim 1, wherein at least one of the first and second annular grooves are defined in the valve member in a dovetail shape.

4. The ball valve of claim 1, wherein the first and second sealing elements provide no extrusion gap extending out of the first and second annular grooves, respectively.

5. The ball valve of claim 1, wherein, when the valve member is in the closed position, the first sealing element sealingly engages the valve seat of the first seal system and the second sealing element sealingly engages the valve seat of the second seal system.

6. The ball valve of claim 1, wherein the first and second seal systems each further comprise a retainer, and wherein the bias spring is positioned between the valve seat and the retainer to apply a constant radial force on the valve seat and thereby urge the valve seat into engagement with the valve member.

7. The ball valve of claim 6, wherein the first and second seal systems each further comprise a spring spacer that interposes the bias spring and the valve seat.

8. The ball valve of claim 1, wherein the first and second seal systems each further comprise a retainer, and wherein the boost piston includes an inner seal and an outer seal, the inner seal being positioned between the boost piston and the valve seat, and the outer seal being positioned between the boost piston and the retainer.

9. The ball valve of claim 8, wherein each sealing element exhibits an inner diameter that is greater than an inner diameter of the inner seal as sealingly engaged against the valve seat and an outer diameter that is less than an outer diameter of the outer seal as sealingly engaged against the retainer.

10. The ball valve of claim 1, wherein the first and second sealing elements are made of a material selected from the group consisting of a polymer, a rubber, an elastomer, and any derivative thereof.

11. The ball valve of claim 10, wherein the first and second sealing elements are made of at least two of the materials.

12. The ball valve of claim 1, wherein the first angular distance is 180°.

13. The ball valve of claim 1, wherein the second angular distance is 90°.

14. A method, comprising:
    providing a ball valve that includes:
        a body that defines first and second valve ports circumferentially offset from each other on the body by a first angular distance;
        a valve member positioned within the body and rotatable about a central axis, the valve member defining an inlet port and first and second outlet ports extending perpendicularly from the central axis;
        a first sealing element mounted within a first annular groove defined on the valve member, and a second sealing element mounted within a second annular groove defined on the valve member, the first and second sealing elements being circumferentially offset from each other on the valve member by the first angular distance and circumferentially offset from the first and second outlet ports by a second angular distance; and
        a first seal system positioned within the first valve port and a second seal system positioned within the second valve port, the first and second seal systems each including a valve seat, a boost piston arranged within a cavity defined at least in part by the valve seat, and a bias spring engageable with the valve seat;
    engaging the valve seat of each seal system on the valve member with the valve member in a closed position, where the first and second outlet ports are misaligned with the first and second valve ports;
    generating a pressure differential across the ball valve and across each of the first and second seal systems;
    urging the valve seat of each seal system against the valve member with the boost piston of each seal system in response to the pressure differential;
    sealingly engaging the valve seat of the first seal system against the valve member and the first sealing element; and
    sealingly engaging the valve seat of the second seal system with the valve member and the second sealing element.

15. The method of claim 14, wherein engaging the valve seat of each seal system on the valve member comprises urging the valve seat of each seal system against the valve member with the bias spring of each seal system and thereby providing the ball valve an initial seal.

16. The method of claim 14, wherein generating the pressure differential across the ball valve comprises at least one of generating a higher pressure inside the ball valve as compared to outside the ball valve and generating a higher pressure outside the ball valve as compared to inside the ball valve.

17. The method of claim 14, wherein the first and second seal systems each further comprise a retainer, and the boost piston of each seal system includes an inner seal positioned between the boost piston and the valve seat and an outer seal positioned between the boost piston and the retainer, and wherein urging the valve seat of each seal system against the valve member with the boost piston of each seal system further comprises:
preventing fluid migration between the boost piston and the valve seat with the inner seal;
preventing fluid migration between the boost piston and the retainer with the outer seal; and
placing a radial load against an angled portion of the valve seat with the boost piston.

18. The method of claim 14, further comprising rotating the valve module about the central axis from the closed position toward an open position, where the first and second outlet ports are aligned with the first and second valve ports.

19. The method of claim 18, wherein rotating the valve module about the central axis comprises rotating the valve module with an actuation device operatively coupled to the valve module.

20. The method of claim 18, further comprising undertaking at least one of a production operation and an injection operation while the valve module is in the open position.

21. The method of claim 14, further comprising:
rotating the valve member to a fractional open position between the closed and open positions;
allowing a choked fluid flow to bypass the valve ports and the valve seats while the valve member is in the fractional open position; and
rotating the valve member to the open position.

22. The method of claim 21, wherein rotating the valve member to the fractional open position further comprises holding the valve member in the fractional open position for a predetermined amount of time.

23. The method of claim 21, wherein rotating the valve member to the fractional open position further comprises holding the valve member in the fractional open position until the pressure differential is removed.

* * * * *